US012597232B2

(12) United States Patent
Vidyaratne et al.

(10) Patent No.: US 12,597,232 B2
(45) Date of Patent: Apr. 7, 2026

(54) SYSTEM FOR LEARNING NEW VISUAL INSPECTION TASKS USING A FEW-SHOT META-LEARNING METHOD

(71) Applicant: HITACHI, Ltd., Tokyo (JP)

(72) Inventors: Lasitha Sandaruwan Vidyaratne, Fremont, CA (US); Xian Yeow Lee, Santa Clara, CA (US); Mahbubul Alam, Fremont, CA (US); Ahmed Farahat, Santa Clara, CA (US); Dipanjan Ghosh, Santa Clara, CA (US); Maria Teresa Gonzalez Diaz, Mountain View, CA (US); Chetan Gupta, Sunnyvale, CA (US)

(73) Assignee: HITACHI, LTD., Tokyo (JP)

( * ) Notice: Subject to any disclaimer, the term of this patent is extended or adjusted under 35 U.S.C. 154(b) by 370 days.

(21) Appl. No.: 18/210,221

(22) Filed: Jun. 15, 2023

(65) Prior Publication Data

US 2024/0420450 A1 Dec. 19, 2024

(51) Int. Cl.
  G06V 10/00 (2022.01)
  G06V 10/74 (2022.01)
  (Continued)

(52) U.S. Cl.
  CPC .......... G06V 10/762 (2022.01); G06V 10/761 (2022.01); G06V 10/7715 (2022.01); G06V 10/7753 (2022.01)

(58) Field of Classification Search
  CPC ............ G06N 3/02; G06N 3/08; G06N 3/042; G06N 3/045; G06N 3/047; G06N 3/082;
  (Continued)

(56) References Cited

U.S. PATENT DOCUMENTS

| | | | |
|---|---|---|---|
| 10,956,817 B2 * | 3/2021 | Oliveira Pinheiro .. | G06N 3/045 |
| 11,449,717 B2 * | 9/2022 | Zhang ................... | G06F 18/254 |

(Continued)

OTHER PUBLICATIONS

Snell, K. Swersky, and R. Zemel, "Prototypical networks for few-shot learning," Advances in neural information processing systems, vol. 30, 2017.

(Continued)

*Primary Examiner* — Amir Alavi

(74) *Attorney, Agent, or Firm* — PROCOPIO, CORY, HARGREAVES & SAVITCH LLP

(57) ABSTRACT

Systems and methods described herein which can involve for a first input of a plurality of labeled images of a new domain task, processing the first plurality of labeled images through a plurality of backbone snapshots, each of the backbone snapshots representative of a model trained across a plurality of other domain tasks, each of the plurality of backbone snapshots configured to output a first plurality of features responsive to the input; processing a second input of second plurality of unlabeled images through the plurality of backbone snapshots to output a second plurality of features responsive to the second input; and generating a representative model for the new domain task from the clustering and transformation of the first plurality of features and as associated from the clustered and transformed second plurality of features.

13 Claims, 8 Drawing Sheets

(51) Int. Cl.
  *G06V 10/762*    (2022.01)
  *G06V 10/77*    (2022.01)
  *G06V 10/774*    (2022.01)
(58) Field of Classification Search
  CPC .... G06N 3/092; G06N 3/0454; G06N 3/0475;
    G06N 3/0464; G06N 3/088; G06N
    3/0499; G06N 3/096; G06N 3/0985;
    G06N 20/00; G06N 20/10; G06N 20/20;
    G06V 10/82; G06V 10/761; G06V
      10/762; G06V 10/7715
  See application file for complete search history.

(56)                References Cited

U.S. PATENT DOCUMENTS

| | | | | |
|---|---|---|---|---|
| 11,544,503 | B2 * | 1/2023 | Tensmeyer | G06V 30/19147 |
| 11,600,113 | B2 * | 3/2023 | Yu | G06V 10/763 |
| 11,651,584 | B2 * | 5/2023 | Venkataramani | G06V 10/82 |
| | | | | 706/12 |
| 11,947,626 | B2 * | 4/2024 | Faraki | G06V 40/172 |
| 12,002,202 | B2 * | 6/2024 | Kiyasseh | G06N 3/08 |
| 12,013,700 | B2 * | 6/2024 | Kalantidis | G05D 1/0231 |
| 12,374,140 | B2 * | 7/2025 | Guo | G06V 30/19173 |
| 2023/0186436 | A1 * | 6/2023 | Chen | G06V 20/70 |
| | | | | 340/576 |
| 2024/0403698 | A1 * | 12/2024 | Sharshevsky | G06N 20/00 |
| 2024/0420450 | A1 * | 12/2024 | Vidyaratne | G06V 10/762 |

OTHER PUBLICATIONS

C. Finn, P. Abbeel, and S. Levine, "Model-agnostic meta-learning for fast adaptation of deep networks," in International conference on machine learning. PMLR, 2017, pp. 1126-1135.

Chen, C. Guan, Z. Wei, X. Wang, and W. Zhu, "Metadelta: A meta-learning system for few-shot image classification," In AAAI Workshop on M et al.earning and MetaDL Challenge. PMLR, 2021, pp. 17-28.

D. Shalam and S. Korman, "The self-optimal-transport feature transform," arXiv preprint arXiv:2204.03065, 2022.

* cited by examiner

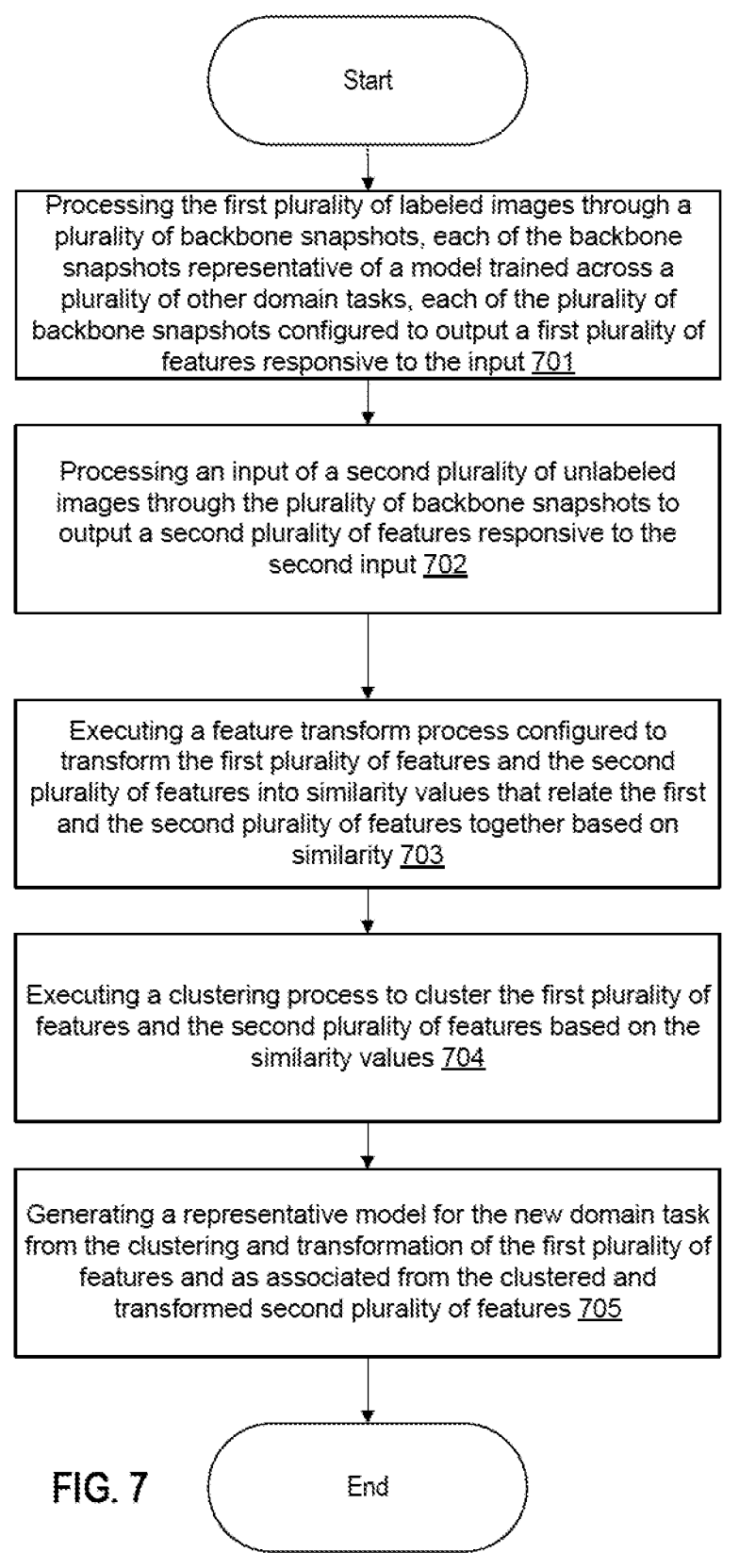

Start

Processing the first plurality of labeled images through a plurality of backbone snapshots, each of the backbone snapshots representative of a model trained across a plurality of other domain tasks, each of the plurality of backbone snapshots configured to output a first plurality of features responsive to the input 701

Processing an input of a second plurality of unlabeled images through the plurality of backbone snapshots to output a second plurality of features responsive to the second input 702

Executing a feature transform process configured to transform the first plurality of features and the second plurality of features into similarity values that relate the first and the second plurality of features together based on similarity 703

Executing a clustering process to cluster the first plurality of features and the second plurality of features based on the similarity values 704

Generating a representative model for the new domain task from the clustering and transformation of the first plurality of features and as associated from the clustered and transformed second plurality of features 705

FIG. 7

End

SYSTEM FOR LEARNING NEW VISUAL INSPECTION TASKS USING A FEW-SHOT META-LEARNING METHOD

BACKGROUND

Field

The present disclosure is generally directed at visual inspection systems, and more specifically, to meta-learning systems for visual inspection tasks.

Related Art

Many businesses, including those in manufacturing and logistics, are leveraging computer vision methods to automate the process of visual inspection. For example, a manufacturing facility may have cameras installed over a manufacturing line to continuously capture images of the products being manufactured. These images are sent to a computer vision algorithm that detects any defects in the manufactured products. If any defects are detected, the system could alert the operator to intervene and make the necessary corrections in the process.

A large majority of related-art computer vision algorithms are deep learning (DL)-based algorithms. These algorithms do not require hand-crafted features or domain knowledge to be specified, but rather takes as input a large amount of labeled data, such as images of defect and non-defect products along with the corresponding labels, and automatically learn a model to detect if a specific image is defective or not. However, traditional methods often require a new model to be trained for every new domain, and DL models require a significant amount of data for training.

Cross-domain meta-learning is a method that trains a generic DL model over multiple domains, such that the model can be fine-tuned and re-used in a new domain without a significant amount of time needed to re-train a model and without needing a large amount of data from the new domain.

In the context above, cross-domain is defined as the process of applying a model across different domains of data. For example, a model that originally classifies defects in transistors (domain A) can be applied to classify defects in carpets (domain B) and classify defects in metal nuts (domain C).

In the context of meta-learning, prominent examples of meta-learning algorithms include algorithms such as Prototypical Networks, Model Agnostic Meta Learning, and MetaDelta. These related-art methods are all variants of meta-learning algorithms which seek to train a model to quickly adapt to a new domain of data. However, most of these related art methods have largely been used for general image classification rather than visual inspection. In terms of visual inspections, popular deep learning methods include transfer learning and domain adaptation. These methods also seek to use a model that is trained on one domain to deploy on another domain. Nonetheless, most of these methods do not generalize well to multiple domains with limited data.

SUMMARY

Many businesses rely on manual labor for the task of visual inspection, which is inefficient and slow. Using a deep-learning-based computer vision model for automated visual inspection can help, but it often does not generalize across multiple domains, and a new model often needs to be developed for new domains of visual inspection. Training a model for each new domain is time and resource intensive and involves the collection of a new dataset, which is not feasible in many industrial applications, as defective data are typically rare. The related art methods described above, such as transfer learning and domain adaptation, will often require some amount of labeled data which is more than the amount of defective data that is typically available in visual inspection domains. Furthermore, the related art methods typically only transfer across specific domains that are similar (e.g., classifying cracks in glass to cracks in wood) and does not generalize well to diverse domains, such as classifying cracks in glass to classifying defects in electronic components and hazelnuts.

Further, meta-learning has not been applied to visual inspection with any success. Other techniques, such as transfer learning and domain adaptation, do not work well for cross domain applications with limited data.

Example implementations described herein are directed to systems and methods that create a model to perform visual inspection across multiple domains of input data. The example implementations use minimal labeled examples to adapt to a new visual inspection domain Further, the example implementations are computationally efficient in adapting to a new visual inspection domain (e.g., order of seconds). The example implementations can also be directly applied to a new visual inspection task without any costly alterations to model architecture.

Example implementations described herein can further involve cross domain visual inspection adaptability by using squeeze-excitation modules and anti-aliasing filters within the backbone architecture.

The example implementations described herein use a combination of classification loss and contrastive loss in the meta-training step for improved cross domain adaptation for visual inspection.

The example implementations further leverage a snapshot-ensembling scheme to obtain multiple backbone versions for better generalization across visual inspection domains.

The example implementations described herein can be generalized to directly adapt to any i-way k-shot visual inspection task. N-way denotes the number of classes in a new visual inspection task ($n >= 2$). K-shots denotes the number of labeled examples per class provided to the model for adaptation.

The example implementations further result in an ensemble of trained models that is computationally efficient to deploy with limited computational resources.

Aspects of the present disclosure can involve a method, which can involve, for a first input of a plurality of labeled images of a new domain task, processing the first plurality of labeled images through a plurality of backbone snapshots, each of the backbone snapshots representative of a model trained across a plurality of other domain tasks, each of the plurality of backbone snapshots configured to output a first plurality of features responsive to the input; processing a second input of second plurality of unlabeled images through the plurality of backbone snapshots to output a second plurality of features responsive to the second input; executing a feature transform process configured to transform the first plurality of features and the second plurality of features into similarity values that relate the first and the second plurality of features together based on similarity; executing a clustering process to cluster the first plurality of features and the second plurality of features based on the similarity values; and generating a representative model for the new domain task from the clustering and transformation of the first plurality of features and as associated from the clustered and transformed second plurality of features.

Aspects of the present disclosure can involve a computer program, which can involve instructions involving, for a first input of a plurality of labeled images of a new domain task, processing the first plurality of labeled images through a plurality of backbone snapshots, each of the backbone snapshots representative of a model trained across a plurality of other domain tasks, each of the plurality of backbone snapshots configured to output a first plurality of features responsive to the input; processing a second input of second plurality of unlabeled images through the plurality of backbone snapshots to output a second plurality of features responsive to the second input; executing a feature transform process configured to transform the first plurality of features and the second plurality of features into similarity values that relate the first and the second plurality of features together based on similarity; executing a clustering process to cluster the first plurality of features and the second plurality of features based on the similarity values; and generating a representative model for the new domain task from the clustering and transformation of the first plurality of features and as associated from the clustered and transformed second plurality of features. The computer program and instructions can be stored on a non-transitory computer readable medium and executed by one or more processors.

Aspects of the present disclosure can involve a system, which can involve, for a first input of a plurality of labeled images of a new domain task, means for processing the first plurality of labeled images through a plurality of backbone snapshots, each of the backbone snapshots representative of a model trained across a plurality of other domain tasks, each of the plurality of backbone snapshots configured to output a first plurality of features responsive to the input; means for processing a second input of second plurality of unlabeled images through the plurality of backbone snapshots to output a second plurality of features responsive to the second input; means for executing a feature transform process configured to transform the first plurality of features and the second plurality of features into similarity values that relate the first and the second plurality of features together based on similarity; means for executing a clustering process to cluster the first plurality of features and the second plurality of features based on the similarity values; and means for generating a representative model for the new domain task from the clustering and transformation of the first plurality of features and as associated from the clustered and transformed second plurality of features.

Aspects of the present disclosure can involve an apparatus, which can involve one or more processors, configured to, for a first input of a plurality of labeled images of a new domain task, processing the first plurality of labeled images through a plurality of backbone snapshots, each of the backbone snapshots representative of a model trained across a plurality of other domain tasks, each of the plurality of backbone snapshots configured to output a first plurality of features responsive to the input; process a second input of second plurality of unlabeled images through the plurality of backbone snapshots to output a second plurality of features responsive to the second input; execute a feature transform process configured to transform the first plurality of features and the second plurality of features into similarity values that relate the first and the second plurality of features together based on similarity; execute a clustering process to cluster the first plurality of features and the second plurality of features based on the similarity values; and generate a representative model for the new domain task from the clustering and transformation of the first plurality of features and as associated from the clustered and transformed second plurality of features.

BRIEF DESCRIPTION OF DRAWINGS

FIG. 7 illustrates an example flow diagram for generating a representative model, in accordance with an example implementation.

DETAILED DESCRIPTION

Figure 1:
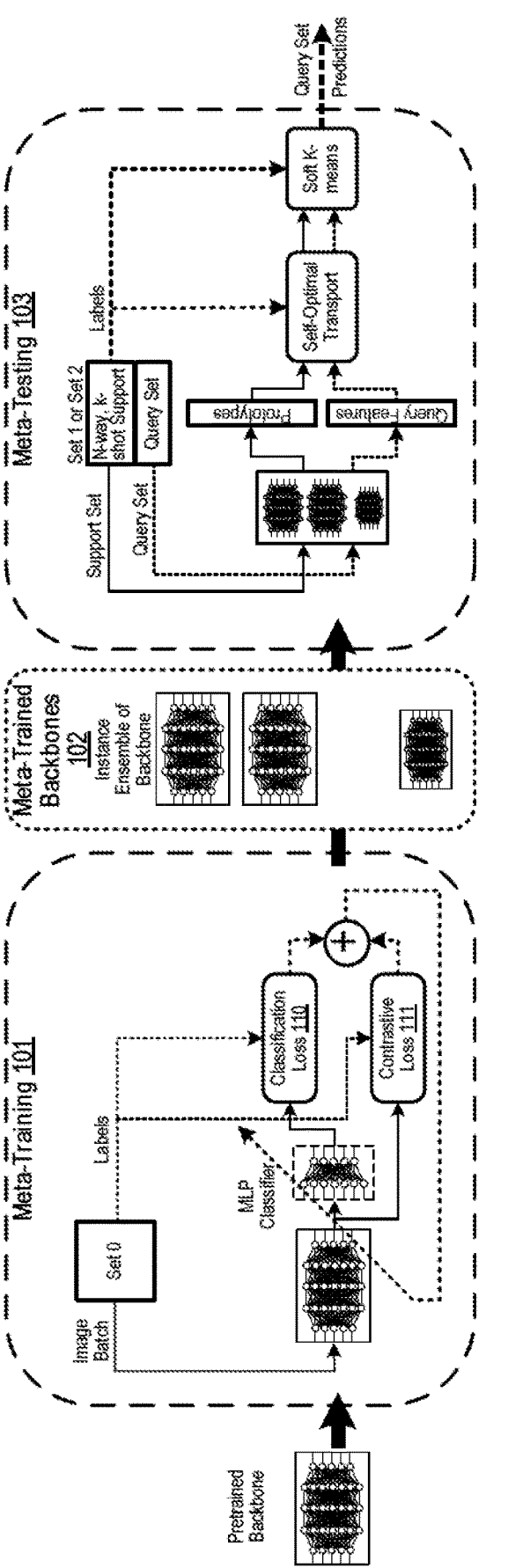
FIG. 1 illustrates an example of the overall framework of the proposed cross-domain meta-learning technique, in accordance with an example implementation.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means or can be implemented through a desired algorithm. Example implementations as described herein can be utilized either singularly or in combination and the functionality of the example implementations can be implemented through any means according to the desired implementations.

FIG. 1 illustrates an example of the overall framework of the proposed cross-domain meta-learning techniques, in accordance with an example implementation. The meta-leaning method illustrated in FIG. 1 involves a meta-training 101 to generate meta-trained backbones 102, and a meta-testing phase 103. During meta-training 101, classification loss 110 and contrastive loss 111 are used together to train the backbones. The detailed explanation of the framework is explained in FIG. 2 to FIG. 6.

Figure 2:
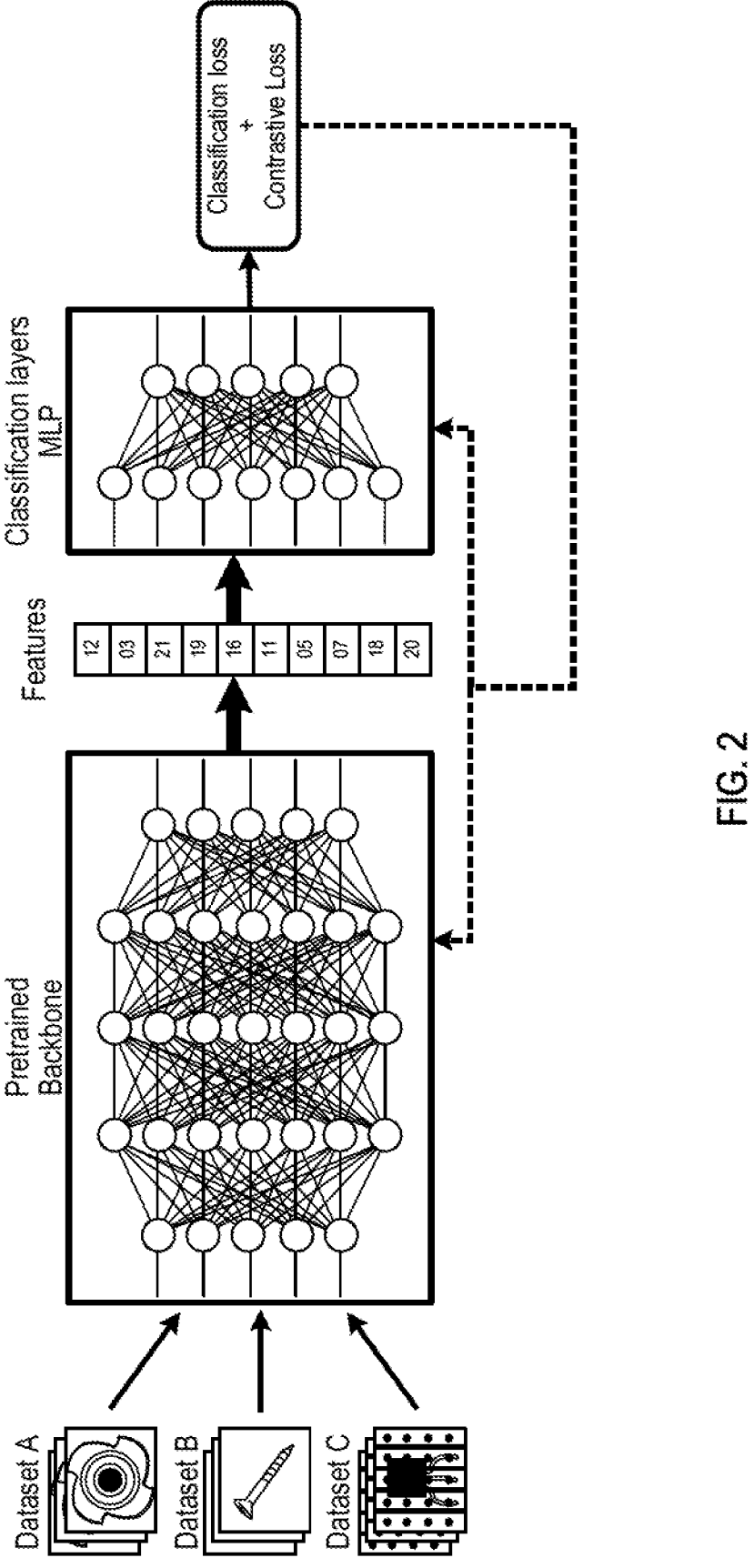
FIG. 2 illustrates an example of the meta-training phase, in accordance with an example implementation.

FIG. 2 illustrates an example of the meta-training phase, in accordance with an example implementation. During meta-training, a backbone model is trained on multiple domains (Dataset A, Dataset B, Dataset C) of visual inspection data. In example implementations described herein, a backbone is a large-scale deep learning model, such as a residual network. Such a backbone can have numerous (e.g., millions) parameters and trained on multiple different image domains using multiple different data sets. Such backbones can also be obtained from publicly available sources, such as those involving datasets of metal objects, circuit boards, and so on.

Specifically, the model is trained on a combination of classification and contrastive loss using a multilayer perceptron (MLP) on top of the backbone. The MLP functions as a classifier, and thus all of the datasets of interest are run through the backbone to generate features that the MLP uses to train the backbone to be familiar with the multiple domains of interest. In the example of FIG. 2, three domains are used, however, more domains may also be used in accordance with the desired implementation, and the present disclosure is not limited thereto. The training is done based on a classification loss (e.g., as defined by a classification objective) as well as a contrastive loss that enforces differences between classes. The training results in a backbone that produces features that are farther apart from each other for different classes, and closer to each other when the classes are the same. Such training thereby helps to improve the feature quality produced by the backbone.

As illustrated in FIG. 2, the backbone generates features that are fed into the MLP and then trained end to end based on the classification loss and contrastive loss. Once such meta-training for multiple domains is done, the MLP classifier can be removed, and the backbone is kept to produce the features.

Figure 3:
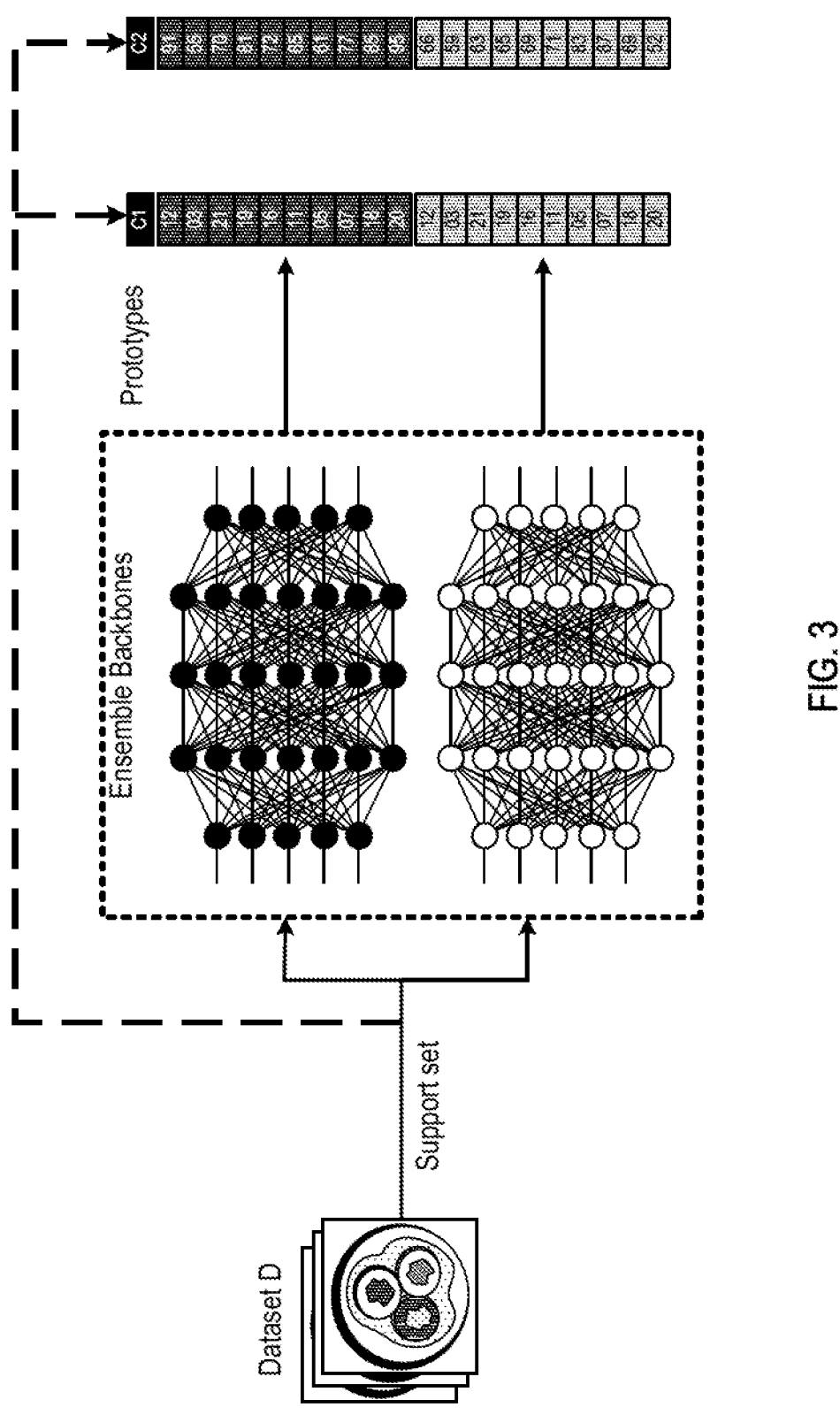
FIG. 3 illustrates the meta-testing process for processing the support set, in accordance with an example implementation.

FIG. 3 illustrates the meta-testing process for processing the support set, in accordance with an example implementation. During meta-testing, a support set involving a few labeled examples from a new visual inspection domain data (Dataset D) is given to backbone model trained in the meta-training phase. This produces a feature set associated with each class label called prototypes. The process is repeated with multiple backbones obtained during the meta-training phase to result in an ensemble of feature set.

To make the training more efficient, the support set is run through multiple backbones that are generated via snapshot ensembling. During the training process, copies of the backbone are kept separately for ensembling processes. The support set is then run through the copies of the backbone to generate multiple feature vectors. The multiple feature vectors are prototypes aggregated across the classes.

Figure 4:
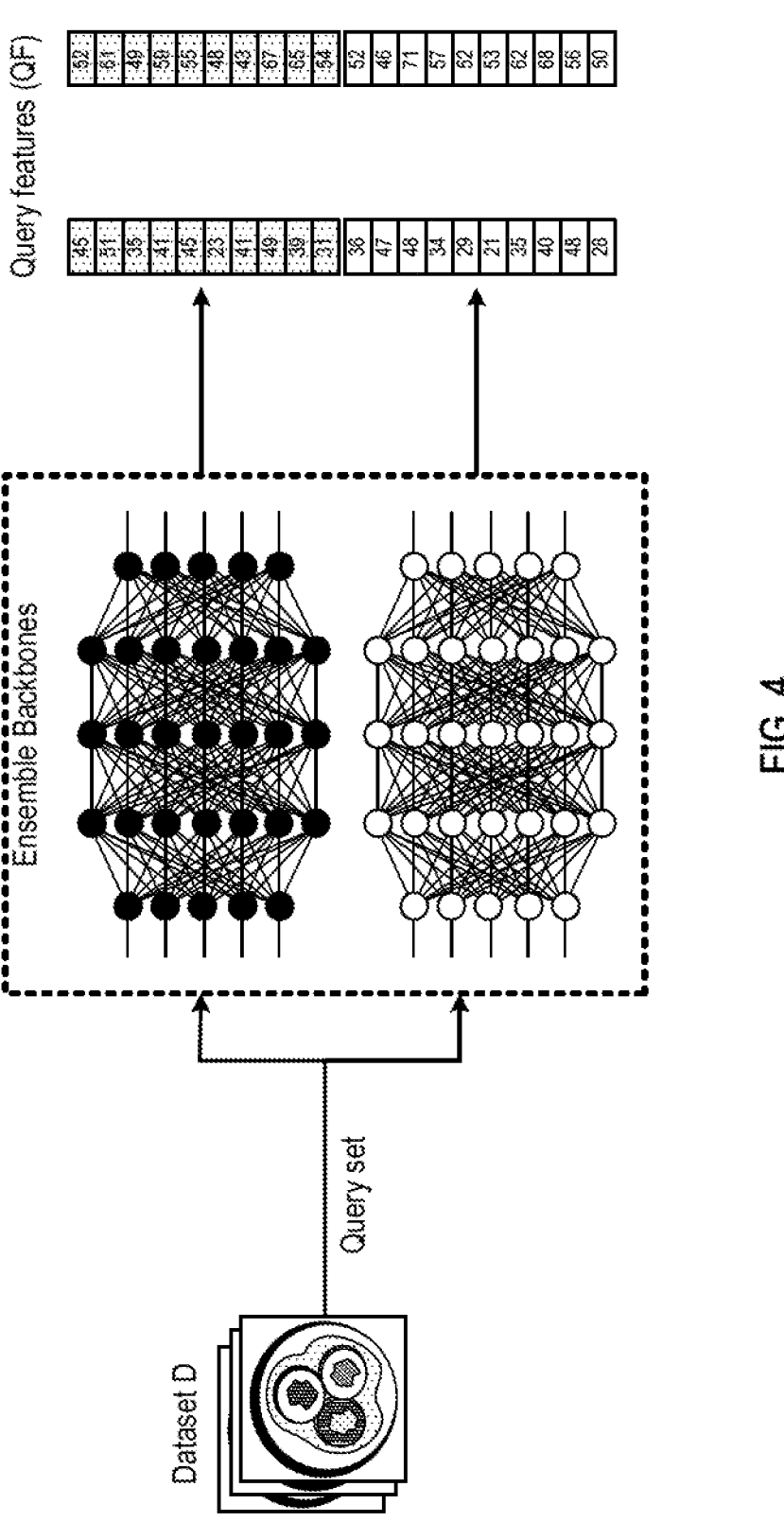
FIG. 4 illustrates the meta-testing process for processing the query set, in accordance with an example implementation.

FIG. 4 illustrates the meta-testing process for processing the query set, in accordance with an example implementation. After processing the support set, the query set, involving the unlabeled data from the new visual inspection domain is also processed by the ensemble of backbone models. This step also produces an ensemble feature set associated with each query input image.

In the example of FIG. 4, the prototypes of FIG. 3 are collected and then the queries are processed as shown in FIG. 4. That is, unlabeled images related to the task or object to be learned are processed into the system. The unlabeled images are sent through the ensemble of backbones to produce query feature vectors. Once the query feature vectors are generated, they are then matched with the prototype feature vectors as described in FIG. 5.

Figure 5:
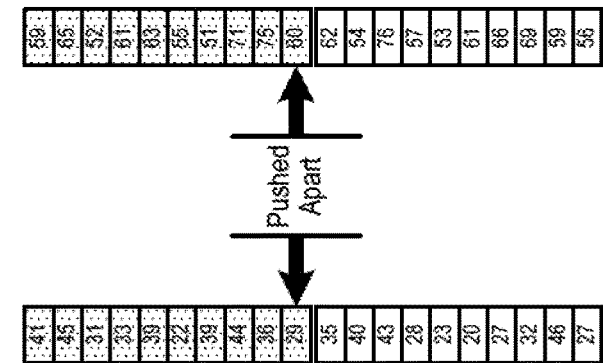
FIG. 5 illustrates an example of the meta-testing phase, involving the Self-Optimal Transport (SOT) feature transform as an instantiation of feature post-processing, in accordance with an example implementation.

FIG. 5 illustrates an example of the meta-testing phase, involving the Self-Optimal Transport (SOT) feature transform as an instantiation of feature post-processing, in accordance with an example implementation. Next, the ensemble of prototypes and query features (from the processes of FIGS. 3 and 4) are further transformed using post-processing techniques that map the features into another space which brings similar features closer and pushes apart dissimilar ones. An example of such a post-processing method is the self-optimal transform (SOT) feature transform algorithm.

In the example of FIG. 5, the SOT feature transform algorithm improves the quality of the features. In the process, the SOT feature transform algorithm pushes apart transformed prototypes and transformed query features so that differing features are pushed farther apart from each other, and similar features are brought closer together.

Figure 6:
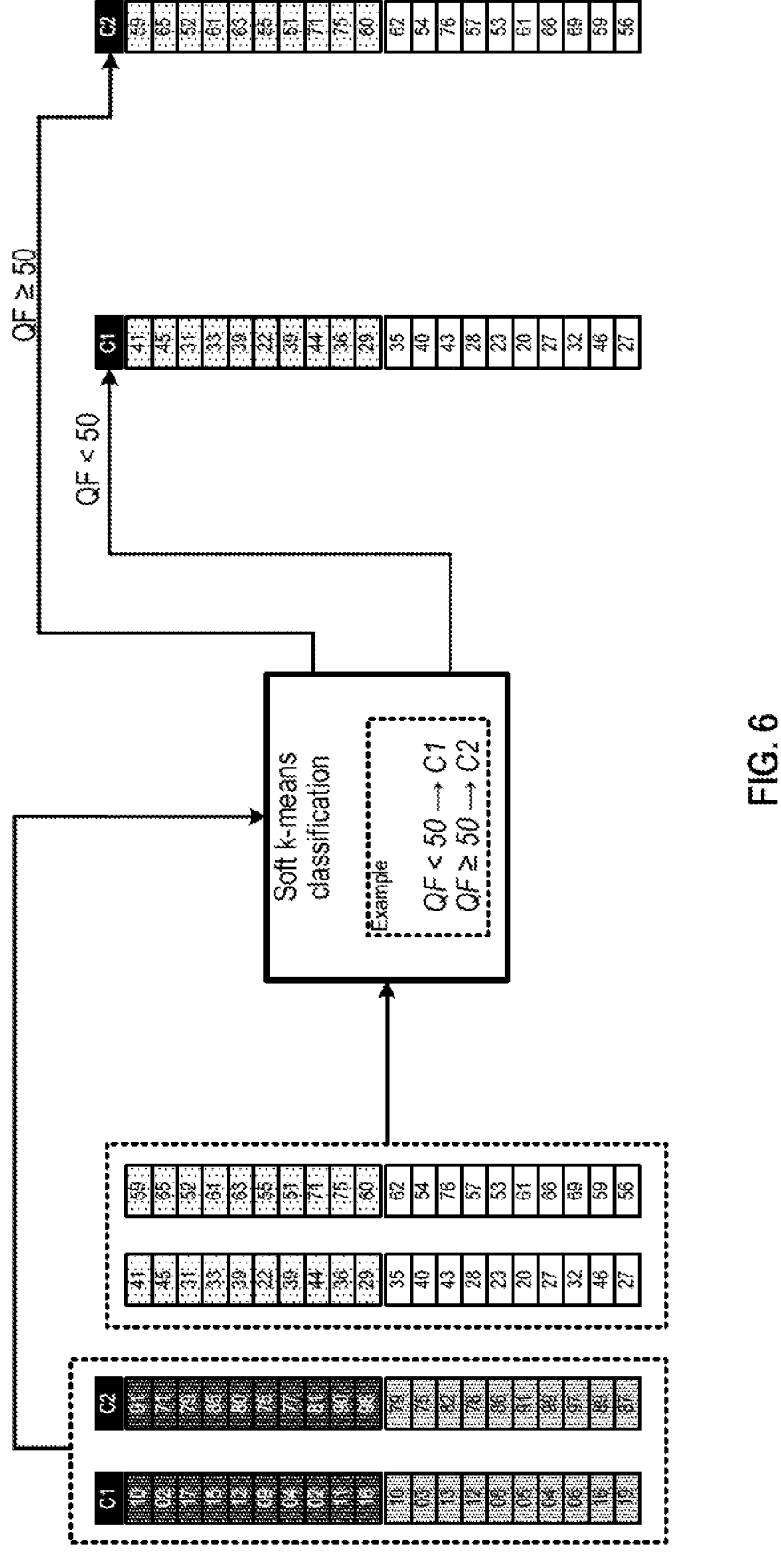
FIG. 6 illustrates an example classification with iterative soft k-means decoder, in accordance with an example implementation.

FIG. 6 illustrates an example classification with iterative soft k-means decoder, in accordance with an example implementation. The labels for query features are assigned based on the closest distance between the query feature and each prototype. In the example of FIG. 6, the prototype features are matched with the query features (the unlabeled features) so that labels can be assigned by using a clustering algorithm such as a soft K-means classification. Through the example implementations illustrated in FIGS. 2 to 6, it is therefore possible to adapt a backbone model to a new task, even though few examples are given.

The example implementations can be considered as follows.

During meta-training, the example implementations can utilize one or more industrial visual inspection datasets as pre-training data for the meta-training phase shown in FIG. 2. To instantiate the backbone model, an open-sourced ImageNet pre-trained SEResNext101 with anti-aliasing filters can be used and trained on the visual inspection pre-training data. The backbone model can be trained following any conventional supervised learning procedure. For example, a training procedure for the model can be as follows: the model is trained using Adam optimizer with a learning rate of 8 $e^{-5}$ and batch size of 60 for approximately four hours, with standard image augmentation techniques such as color normalization, horizontal flipping, blurring, and perspective transforms being performed on-the-fly during training. Additionally, the model is trained using a combination of classification loss, specifically, supervised cross-entropy loss, and a contrastive loss (e.g., triplet margin loss), with the contrastive loss having a weight factor of 10 while the supervised loss was weighted with a factor of 1. The top-2 best-performing models are saved based on the validation score during the training process to use as an ensemble and extract a more diverse set of features during the meta-testing phase.

During the meta-testing phase, given a new domain of visual inspection data, the ensemble of backbone models trained in the previous meta-training phase are loaded. Next, a small number of labeled examples are collected from the new domain of visual inspection data to build the support set and set aside the rest of the unlabeled data as the query set. After obtaining the support and query sets, features of the query set and support set can be generated by running the images through the ensemble of backbone model and concatenating the features together, as shown in FIG. 3 and FIG. 4. Based on FIG. 5, the features of the support and query set are transformed using the self-optimal transport algorithm (SOT) and the SOT-transformed features are sent to an iterative soft k-means decoder to assign labels to the query set based on the closest distance between query features and each prototype.

Through the example implementations described herein, there is a novel solution for automated visual inspection that results in a trained model that can be easily deployed by clients, regardless of the domain, using minimal computational resources and labeled data. The method also allows for rapid deployment, based on client preferences, making it an ideal solution for businesses with time and resource constraints. With the automated visual inspection provided by the example implementations described herein, clients can significantly reduce their expenditure for manual inspection, while benefiting from a highly accurate and efficient process. Furthermore, the example implementations described herein reduce the development time and cost for creating a new automated visual inspection solution for a different domain, thereby enhancing its capacity for innovation and providing a cost-effective solution for clients.

FIG. 7 illustrates an example flow diagram for generating a representative model, in accordance with an example implementation. To start the flow, an input of a first plurality of labeled images of a new domain task is provided as illustrated in FIG. 3 (Dataset D). At 701, the flow processes the first plurality of labeled images through a plurality of backbone snapshots, each of the backbone snapshots representative of a model trained across a plurality of other domain tasks (e.g., as illustrated in FIG. 2), each of the plurality of backbone snapshots configured to output a first plurality of features responsive to the input as illustrated in FIG. 3. At 702, the flow processes a second input of second plurality of unlabeled images through the plurality of backbone snapshots to output a second plurality of features responsive to the second input as illustrated in FIG. 4. At 703, the flow executes a feature transform process configured to transform the first plurality of features and the second plurality of features into similarity values that relate the first and the second plurality of features together based on similarity as illustrated in FIG. 5. At 704, the flow executes a clustering process to cluster the first plurality of features and the second plurality of features based on the similarity values as illustrated in FIG. 6; and then generates a representative model for the new domain task from the clustering and transformation of the first plurality of features and as associated from the clustered and transformed second plurality of features at 705.

Figure 8:
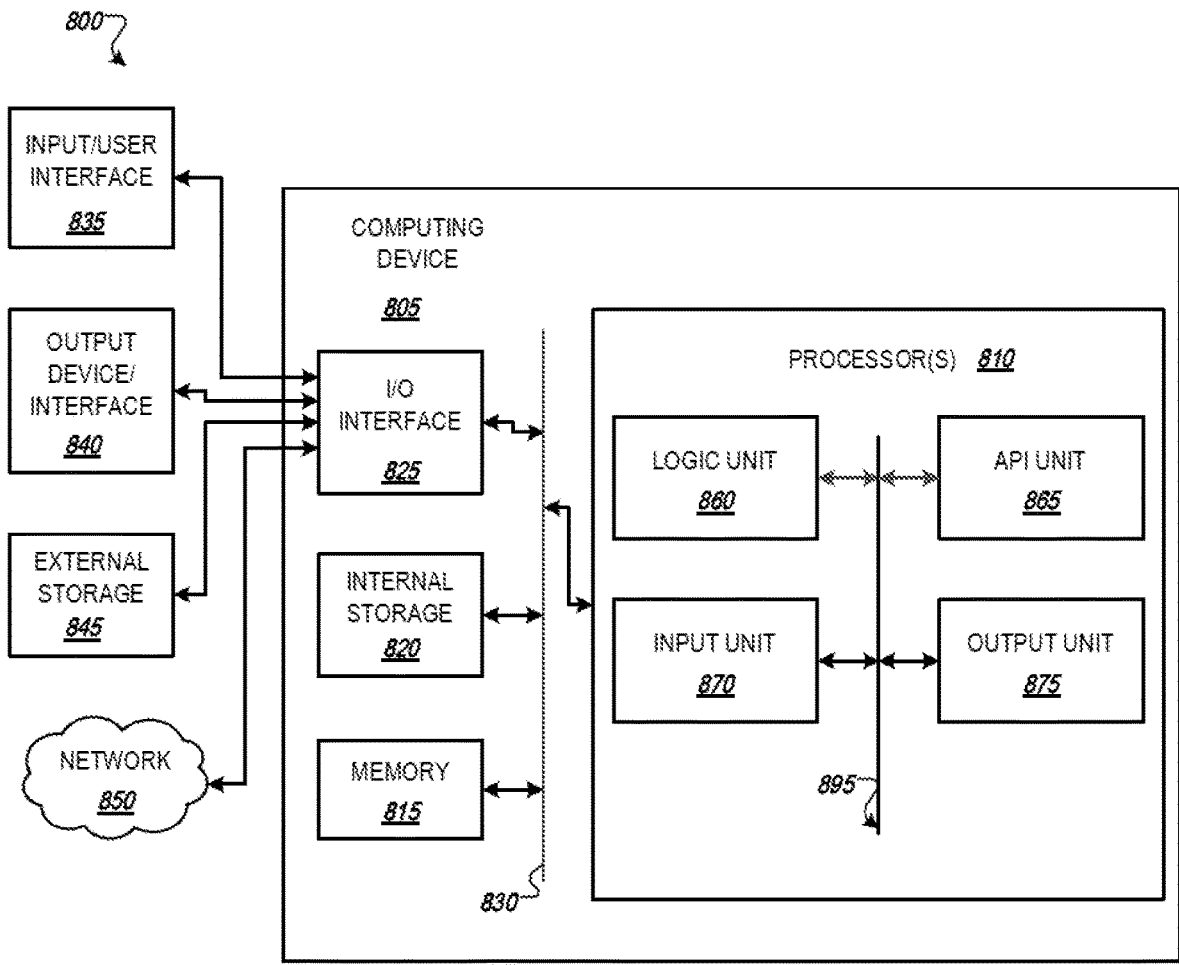
FIG. 8 illustrates an example computing environment with an example computer device suitable for use in some example implementations.

FIG. 8 illustrates an example computing environment with an example computer device suitable for use in some example implementations. Computer device 805 in computing environment 800 can include one or more processing units, cores, or processors 810, memory 815 (e.g., RAM, ROM, and/or the like), internal storage 820 (e.g., magnetic, optical, solid-state storage, and/or organic), and/or IO interface 825, any of which can be coupled on a communication mechanism or bus 830 for communicating information or embedded in the computer device 805. IO interface 825 is also configured to receive images from cameras or provide images to projectors or displays, depending on the desired implementation.

Computer device 805 can be communicatively coupled to input/user interface 835 and output device/interface 840. Either one or both of the input/user interface 835 and output device/interface 840 can be a wired or wireless interface and can be detachable. Input/user interface 835 may include any device, component, sensor, or interface, physical or virtual, that can be used to provide input (e.g., buttons, touch-screen interface, keyboard, a pointing/cursor control, microphone, camera, braille, motion sensor, accelerometer, optical reader, and/or the like). Output device/interface 840 may include a display, television, monitor, printer, speaker, braille, or the like. In some example implementations, input/user interface 835 and output device/interface 840 can be embedded with or physically coupled to the computer device 805. In other example implementations, other computer devices may function as or provide the functions of input/user interface 835 and output device/interface 840 for a computer device 805.

Examples of computer device 805 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 805 can be communicatively coupled (e.g., via IO interface 825) to external storage 845 and network 850 for communicating with any number of networked components, devices, and systems, including one or more computer devices of the same or different configuration. Computer device 805 or any connected computer device can be functioning as, providing services of, or referred to as a server, client, thin server, general machine, special-purpose machine, or another label.

IO interface 825 can include but is not limited to, wired and/or wireless interfaces using any communication or IO protocols or standards (e.g., Ethernet, 802.11x, Universal System Bus, WiMAX, modem, a cellular network protocol, and the like) for communicating information to and/or from at least all the connected components, devices, and network in computing environment 800. Network 850 can be any network or combination of networks (e.g., the Internet, local area network, wide area network, a telephonic network, a cellular network, satellite network, and the like).

Computer device 805 can use and/or communicate using computer-usable or computer readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid-state media (e.g., RAM, ROM, flash memory, solid-state storage), and other non-volatile storage or memory.

Computer device 805 can be used to implement techniques, methods, applications, processes, or computer-executable instructions in some example computing environments. Computer-executable instructions can be retrieved from transitory media and stored on and retrieved from non-transitory media. The executable instructions can originate from one or more of any programming, scripting, and machine languages (e.g., C, C++. C#, Java, Visual Basic, Python, Perl, JavaScript, and others).

Processor(s) 810 can execute under any operating system (OS)(not shown), in a native or virtual environment. One or more applications can be deployed that include logic unit 860, application programming interface (API) unit 865, input unit 870, output unit 875, and inter-unit communication mechanism 895 for the different units to communicate with each other, with the OS, and with other applications (not shown). The described units and elements can be varied in design, function, configuration, or implementation and are not limited to the descriptions provided. Processor(s) 810 can be in the form of hardware processors such as central processing units (CPUs) or in a combination of hardware and software units.

In some example implementations, when information or an execution instruction is received by API unit 865, it may be communicated to one or more other units (e.g., logic unit 860, input unit 870, output unit 875). In some instances, logic unit 860 may be configured to control the information flow among the units and direct the services provided by API unit 865, the input unit 870, the output unit 875, in some example implementations described above. For example, the flow of one or more processes or implementations may be controlled by logic unit 860 alone or in conjunction with API unit 865. The input unit 870 may be configured to obtain input for the calculations described in the example implementations, and the output unit 875 may be configured to provide an output based on the calculations described in example implementations.

Processor(s) 810 can be configured to execute a method or instructions involving, for an input of a first plurality of labeled images of a new domain task, processing the first plurality of labeled images through a plurality of backbone snapshots, each of the backbone snapshots representative of a model trained across a plurality of other domain tasks, each of the plurality of backbone snapshots configured to output a first plurality of features responsive to the input as described with respect to 701 of FIG. 7; processing a second input of second plurality of unlabeled images through the plurality of backbone snapshots to output a second plurality of features responsive to the second input as described with respect to 702 of FIG. 7; executing a feature transform process configured to transform the first plurality of features and the second plurality of features into similarity values that relate the first and the second plurality of features together based on similarity as described with respect to 703 of FIG. 7; executing a clustering process to cluster the first plurality of features and the second plurality of features based on the similarity values as described with respect to 704 of FIG. 7; and generating a representative model for the new domain task from the clustering and transformation of the first plurality of features and as associated from the clustered and transformed second plurality of features as described with respect to 705 of FIG. 7.

Processor(s) 810 can be configured to execute the method or instructions as described herein, wherein the plurality of backbone snapshots are meta-trained in combination with a multilayer perceptron (MLP) layer as described with respect to FIG. 2.

As described herein, the plurality of backbone snapshots can be meta-trained based on a classification loss and a contrastive loss as illustrated in FIG. 2.

As described herein, the new domain task can be directed to any target object or task in accordance with the desired implementation. For example, if the new domain task is directed to visual inspection, then the labeled images can involve (as classes) the different defect types for an object or task for the visual inspection, wherein the representative model is configured to output defects detected in the visual inspection. Other domain tasks can also be used, and the present disclosure is not thereby limited.

As described herein, the plurality of backbone snapshots can be representative of industrial tasks or objects. For example, the backbone can be trained across industrial objects (e.g., solder, screw, nails, etc.) along with their respective potential defects, or tasks (e.g., visual inspection of applying solder, visual inspection of driving a screw, etc.) along with their respective potential defects, in accordance with the desired implementation.

As described herein, each of the plurality of the backbone snapshots can be configured with squeeze and excitation layers and anti-aliasing filters to facilitate cross-domain visual inspection. The squeeze-excitation layers enable the backbone snapshots to extract more important features across the channels of the inputs and the anti-aliasing filters enables the backbone snapshots to mitigate sampling distortions when extracting features from images. Together, these two techniques would enable the backbone snapshots to extract more generalizable and less noisy features, thus improving the overall performance across different domains of visual inspection tasks.

As described herein in FIGS. 4 and 5, the new domain task can be associated with a first plurality of classes for the task, wherein the plurality of labeled images involves examples for each of the plurality of classes. The classes can have different defects, different subtasks, and so on, depending on the desired implementation.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the techniques of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit or can be spread across a number of components in any number of ways. When performed by software, the methods may be executed by a processor, such as a general-purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the techniques of the present application. Various aspects and/or components of the described example implementations may be used singly or in any combination. It is intended that the specification and example implementations be considered as examples only, with the true scope and spirit of the present application being indicated by the following claims.

What is claimed is:

1. A method, comprising:
   for an input of a first plurality of labeled images of a new domain task, processing the first plurality of labeled images through a plurality of backbone snapshots, each of the backbone snapshots representative of a model trained across a plurality of other domain tasks, each of the plurality of backbone snapshots configured to output a first plurality of features responsive to the input;
   processing a second input of second plurality of unlabeled images through the plurality of backbone snapshots to output a second plurality of features responsive to the second input;
   executing a feature transform process configured to transform the first plurality of features and the second plurality of features into similarity values that relate the first and the second plurality of features together based on similarity;
   executing a clustering process to cluster the first plurality of features and the second plurality of features based on the similarity values; and
   generating a representative model for the new domain task from the clustering and transformation of the first plurality of features and as associated from the clustered and transformed second plurality of features, wherein the new domain task is visual inspection, wherein the labeled images involve defect types for an object or task for the visual inspection, wherein the representative model is configured to output defects detected in the visual inspection.

2. The method of claim 1, wherein the plurality of backbone snapshots are meta-trained in combination with a multilayer perceptron (MLP).

3. The method of claim 2, wherein the plurality of backbone snapshots are meta-trained based on a classification loss and a contrastive loss.

4. The method of claim 1, wherein features produced from the plurality of backbone snapshots are representative of industrial tasks or objects.

5. The method of claim 1, wherein the each of the plurality of the backbone snapshots are configured with squeeze and excitation layers and anti-aliasing filters to facilitate cross-domain visual inspection.

6. The method of claim 1, wherein the new domain task is associated with a first plurality of classes for the task, wherein the plurality of labeled images comprises examples for each of the plurality of classes.

7. A non-transitory computer readable medium, storing instructions for executing a process, the instructions comprising:
   for an input of a first plurality of labeled images of a new domain task, processing the first plurality of labeled images through a plurality of backbone snapshots, each of the backbone snapshots representative of a model trained across a plurality of other domain tasks, each of the plurality of backbone snapshots configured to output a first plurality of features responsive to the input;
   processing a second input of second plurality of unlabeled images through the plurality of backbone snapshots to output a second plurality of features responsive to the second input;
   executing a feature transform process configured to transform the first plurality of features and the second plurality of features into similarity values that relate the first and the second plurality of features together based on similarity;
   executing a clustering process to cluster the first plurality of features and the second plurality of features based on the similarity values; and
   generating a representative model for the new domain task from the clustering and transformation of the first plurality of features and as associated from the clustered and transformed second plurality of features, wherein the new domain task is visual inspection, wherein the labeled images involve defect types for an object or task for the visual inspection, wherein the representative model is configured to output defects detected in the visual inspection.

8. The non-transitory computer readable medium of claim 7, wherein the plurality of backbone snapshots are meta-trained in combination with a multilayer perceptron (MLP).

9. The non-transitory computer readable medium of claim 8, wherein the plurality of backbone snapshots are meta-trained based on a classification loss and a contrastive loss.

10. The non-transitory computer readable medium of claim 7, wherein features produced from the plurality of backbone snapshots are representative of industrial tasks or objects.

11. The non-transitory computer readable medium of claim 7, wherein each of the plurality of the backbone snapshots are configured with squeeze and excitation layers and anti-aliasing filters to facilitate cross-domain visual inspection.

12. The non-transitory computer readable medium of claim 7, wherein the new domain task is associated with a first plurality of classes for the task, wherein the plurality of labeled images comprises examples for each of the plurality of classes.

13. An apparatus, comprising:
   a processor, configured to:
   for an input of a first plurality of labeled images of a new domain task, process the first plurality of labeled images through a plurality of backbone snapshots, each of the backbone snapshots representative of a model trained across a plurality of other domain tasks, each of the plurality of backbone snapshots configured to output a first plurality of features responsive to the input;

process a second input of second plurality of unlabeled images through the plurality of backbone snapshots to output a second plurality of features responsive to the second input;

execute a feature transform process configured to transform the first plurality of features and the second plurality of features into similarity values that relate the first and the second plurality of features together based on similarity;

execute a clustering process to cluster the first plurality of features and the second plurality of features based on the similarity values; and generate a representative model for the new domain task from the clustering and transformation of the first plurality of features and as associated from the clustered and transformed second plurality of features, wherein the new domain task is visual inspection, wherein the labeled images involve defect types for an object or task for the visual inspection, wherein the representative model is configured to output defects detected in the visual inspection.

* * * * *